No. 719,763. PATENTED FEB. 3, 1903.
T. E. DEVONSHIRE.
CONSTRUCTION OF UNDERGROUND CONDUITS.
APPLICATION FILED NOV. 8, 1902.
NO MODEL. 12 SHEETS—SHEET 1.

WITNESSES:
F. Wainright
E. W. Collins

INVENTOR
THOMAS E. DEVONSHIRE
BY
Howson and Howson
HIS ATTORNEYS.

No. 719,763. PATENTED FEB. 3, 1903.
T. E. DEVONSHIRE.
CONSTRUCTION OF UNDERGROUND CONDUITS.
APPLICATION FILED NOV. 8, 1902.
NO MODEL.
12 SHEETS—SHEET 2.

WITNESSES:
G. W. Wright.
E. W. Collins

INVENTOR
THOMAS E. DEVONSHIRE
BY
Howson and Howson
HIS ATTORNEYS.

No. 719,763. PATENTED FEB. 3, 1903.
T. E. DEVONSHIRE.
CONSTRUCTION OF UNDERGROUND CONDUITS.
APPLICATION FILED NOV. 8, 1902.
NO MODEL. 12 SHEETS—SHEET 3.

WITNESSES.
G. W. Wright
E. W. Collins

INVENTOR
THOMAS E. DEVONSHIRE
BY
Howson and Howson
HIS ATTORNEYS.

No. 719,763. PATENTED FEB. 3, 1903.
T. E. DEVONSHIRE.
CONSTRUCTION OF UNDERGROUND CONDUITS.
APPLICATION FILED NOV. 8, 1902.
NO MODEL.
12 SHEETS—SHEET 4.

WITNESSES:
F. W. Wright
E. W. Collins

INVENTOR
THOMAS E. DEVONSHIRE
BY
Howson and Howson
HIS ATTORNEYS

No. 719,763. PATENTED FEB. 3, 1903.
T. E. DEVONSHIRE.
CONSTRUCTION OF UNDERGROUND CONDUITS.
APPLICATION FILED NOV. 8, 1902.
NO MODEL. 12 SHEETS—SHEET 6.

No. 719,763. PATENTED FEB. 3, 1903.
T. E. DEVONSHIRE.
CONSTRUCTION OF UNDERGROUND CONDUITS.
APPLICATION FILED NOV. 8, 1902.
NO MODEL. 12 SHEETS—SHEET 7.

WITNESSES:
F. W. Wright
E. W. Collins

INVENTOR
THOMAS E. DEVONSHIRE
BY Howson and Howson
HIS ATTORNEYS.

No. 719,763. PATENTED FEB. 3, 1903.
T. E. DEVONSHIRE.
CONSTRUCTION OF UNDERGROUND CONDUITS.
APPLICATION FILED NOV. 8, 1902.
NO MODEL. 12 SHEETS—SHEET 8.

Fig. 13.

WITNESSES
P. W. Wright
E. W. Collins

INVENTOR
THOMAS E. DEVONSHIRE
BY
Howson and Howson
HIS ATTORNEYS

No. 713,763. PATENTED FEB. 3, 1903.
T. E. DEVONSHIRE.
CONSTRUCTION OF UNDERGROUND CONDUITS.
APPLICATION FILED NOV. 8, 1902.
NO MODEL. 12 SHEETS—SHEET 10.

WITNESSES:
P. W. Wright
E. W. Collins

INVENTOR
THOMAS E. DEVONSHIRE
BY
Howson and Howson
HIS ATTORNEYS

UNITED STATES PATENT OFFICE.

THOMAS EASTON DEVONSHIRE, OF CHISLEHURST, ENGLAND.

CONSTRUCTION OF UNDERGROUND CONDUITS.

SPECIFICATION forming part of Letters Patent No. 719,763, dated February 3, 1903.

Application filed November 8, 1902. Serial No. 130,512. (No model.)

*To all whom it may concern:*

Be it known that I, THOMAS EASTON DEVONSHIRE, civil engineer, a subject of the King of Great Britain and Ireland, residing at Pirbright, Chislehurst, in the county of Kent, England, have invented certain new and useful Improvements in the Construction of Underground Conduits, more especially intended for use in systems of underground electric traction, of which the following is a specification.

The object of my invention is to provide underground conduits more especially intended for use in systems of electric traction, which conduits present a continuous tube or channel for the conductors—for example, in electric traction—and can be made in lengths aboveground before being put in place, my invention enabling conduits to be made more readily and economically than hitherto and so that they are stronger and less liable to be damaged by traffic or otherwise than is the case with conduits as hitherto made, the construction being such that an even width of slot along the upper side of the conduit is maintained, and there is a bearing for the slot-rails upon the conduit throughout the whole length thereof. For this purpose I form a metal framework, as hereinafter described, which is embedded in cement, mortar, or concrete molded around it, the lengths of conduit being formed with flanges for connecting them together.

The conduit may be so made that it is of but small depth and will prevent accumulation of mud, snow, or water immediately under the slot in the conduit and under the conductor-rails or allow of ready removal of any accumulation of mud or snow therefrom. For this purpose I form the central longitudinal part of the bottom of the interior of the part of the conduit which contains the conductors with a raised portion beneath the longitudinal slot in the conduit, which raised portion joins the side portions of the bottom of the conduit preferably in gentle curves or inclines on each side, the said side portions of the conduit constituting side channels, into which mud, snow, or water, which may find admission through the slot to the conduit, will pass or into which any accumulation of mud, snow, or other matter can be readily brushed, scraped, or pushed, so that accumulation in the space in which the conductors are situated is prevented.

I will describe my invention with reference to the accompanying drawings, in which—

Figure 1 represents in end elevation, with one-half of the cement, mortar, or concrete removed to show the metal parts, Fig. 9 shows some lengths of conduit joined together in a road in constructing a line, part of the excavation being unfilled in. Fig. 10 is a perspective view of a portion of a conduit constructed according to a modification as hereinafter described and laid in a road in constructing a line, part of the excavation being shown unfilled in. Fig. 17 is an end view.

Referring first to Figs. 1 to 9, the conduit consists of lengths made of cement, mortar, or concrete A and slotted at top, as shown at $a$, and consisting of body parts having flanges $a^2$ at each end for joining the lengths of pipe together. The said flanges $a^2$ are formed in one with the body of the length of conduit and are surrounded by a metal frame $b$. The lengths of conduit have (embedded in the cement, mortar, or concrete, of which they are formed) perforated metal or metal network $c$, so disposed as to resist tensile stress, which cement, mortar, or concrete alone would not be able to resist. If desired, supplementary flanges may be similarly formed midway on the lengths of conduit or at any suitable intervals of lengths. The flanges $a^2$ are provided with bolt-holes, so that the successive lengths of conduit can be bolted together to form a continuous conduit. The aforesaid metal frame $b$ surrounding each of the flanges $a^2$ is preferably made of channel-iron. The slot or opening $a$ in the top of the conduit should be of equal width throughout and be defined and strengthened by angle-arms $d$, placed the proper distance apart and extending from the outer face of the flange $a^2$ at one end to the outer face of the flange $a^2$ at the other end. To these angle-irons $d$ is attached the aforesaid perforated metal or metal network $c$, which forms "armoring" for the cement, mortar, or concrete to give it the requisite tensile strength. This perforated metal or metal network is preferably made in the form, as shown, of two semicircular sheets of "expanded metal," on each of which sheets an unperforated strip $c^2$ is left along the upper edge, this strip affording a convenient means of attaching the armoring to the angle-irons $d$ at the slot. To hold the said sheets $c$ in place during the molding of the lengths of conduit, I rivet to or form with the lower member of the channel-iron frame $b$ around the flanges $a^2$ a vertical metal rib $f$, curved at the top to conform to the general shape of the lower part of the armoring. This rib also adds to the stiffness of the flanges at the part where the strain is greatest. At the flanged ends of each length of pipe (and also at the supplementary flange or flanges, if such be used) a screw-bolt $g$ is passed at each side through the angle-iron $d$ at the slot and through the channel-iron frame $b$ of the flange, and these bolts $g$ are buried in the cement, mortar, or concrete filling and make the flanges $a^2$ rigid. Light angle-iron rings are preferably introduced into the outer ends of the lengths of conduit to strengthen the joint and insure true alinement of the conduit. The lengths of conduit, with their flanges, are completed before being laid in the trench prepared for them by placing the metal parts described in proper position in molds of the desired shape for the exterior of the conduit and introducing cement, mortar, or concrete into the mold, a proper core being used to give the requisite shape to the inside of the conduit.

The slot-rails $i$ bear on the upper part of the conduit throughout their entire length and are held in place by screw-bolts $j$, passed through the horizontal flanges of the said rails $i$ and of the angle-irons $d$ at the slot $a$.

Figure 1:
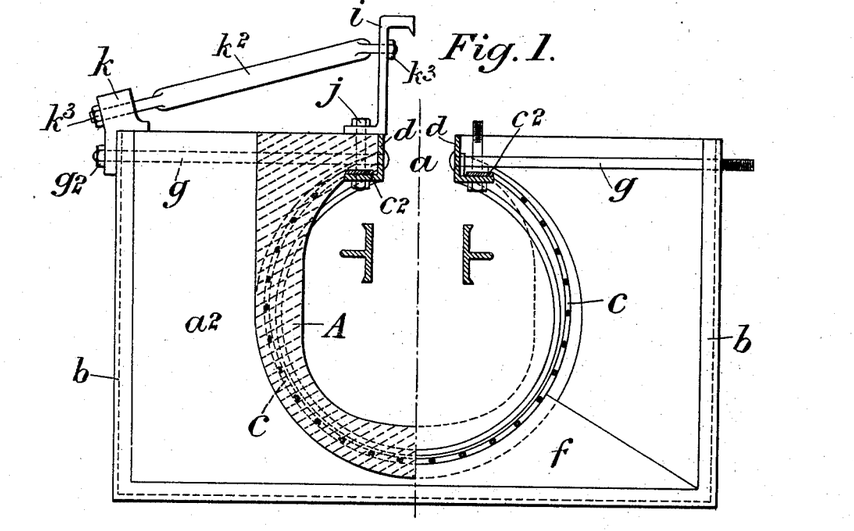
Figure 2:
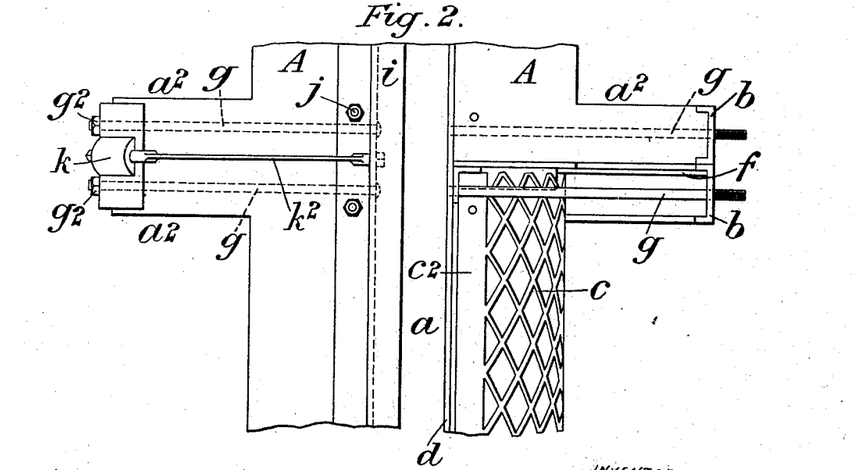
Fig. 2 represents in corresponding plan, the meeting ends of two lengths of a conduit constructed according to my invention.
Figure 3:
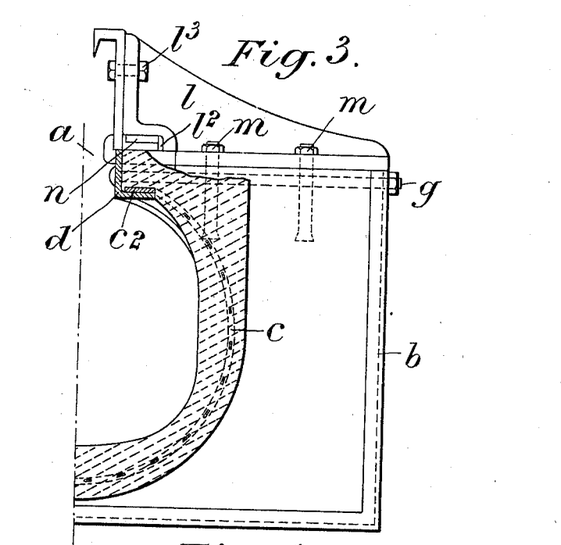
Figs. 3 to 8 represent modifications thereof.
Figure 4:
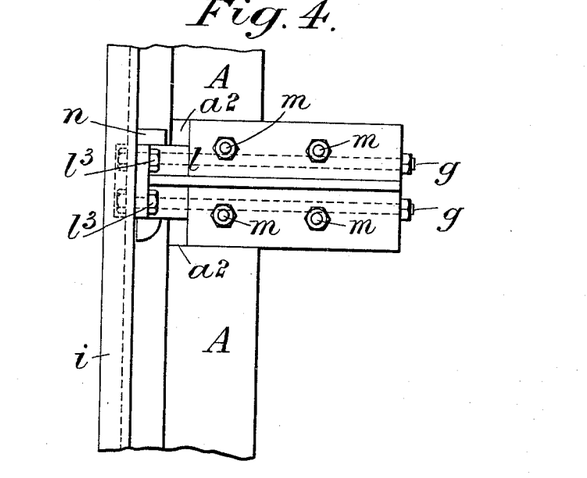

To prevent the slot between the rails $i$ becoming closed by the pressure of traffic or otherwise, I anchor them or hold them back to the frames $b$ of the flanges $a^2$. This may be done by means of lug-pieces $k$, set upon the corners of the frames $b$ of the flanges, to which they are held by the nuts $g^2$ on the aforesaid bolts $g$, connecting the angle-irons $d$ to the said frames $b$. At the joints between the lengths of pipe these lug-pieces $k$ span the adjacent flanges, as shown in Fig. 2, and are held by the two bolts $g$, while at the supplementary flange or flanges (if such be used) they would be held by one such bolt. The slot-rails $i$ are each anchored back to these lug-pieces $k$ by bolts or screw-ended tie-bars $k^2$, passing through the webs of the said rails $i$ and through holes in the lug-pieces $k$, nuts $k^3$ being screwed onto the screwed ends of the said tie-bars $k^2$.

It will be understood that there is a like slot-rail and connecting arrangement at each side of the slot $a$.

The rails $i$ can by the arrangements described be bolted down to a solid bearing and be anchored or held back at short intervals. The lug-pieces $k$ and anchoring or holding-back arrangements described may be replaced by chairs secured to the tops of the flanges, the slot-rails $i$ being keyed and bolted to the said chairs. This modification is illustrated by the half end elevation and half plan in Figs. 3 and 4, where the chair is marked $l$. It is secured to the abutting flanges $a^2$ by screw-nuts on bolts $m$, having their lower ends embedded in the cement, mortar, or concrete of the flanges. The foot-flanges of each of the slot-rails $i$ are received in a recess $l^2$ in the said chair and secured therein by a key $n$, the web of the rail being secured to the chair $l$ by means of bolts and nuts, as shown at $l^2$.

Figure 5:
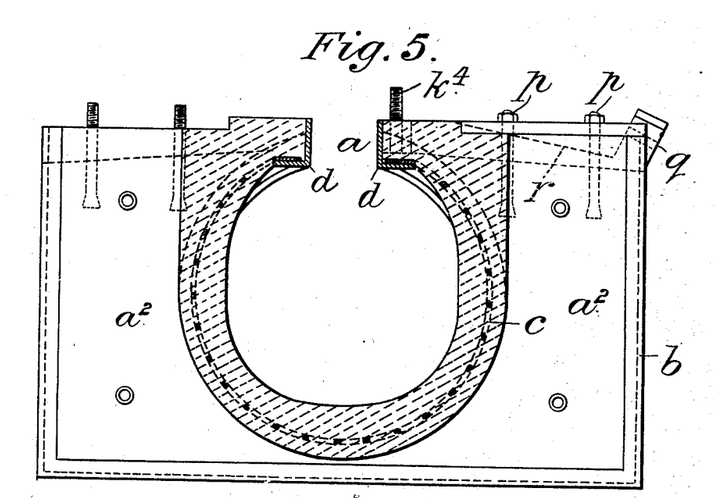
Figure 6:
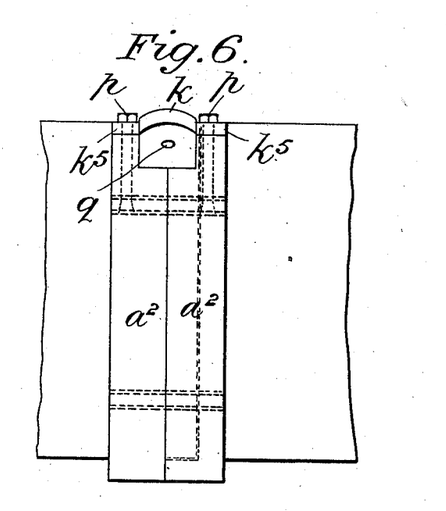
Figure 7:
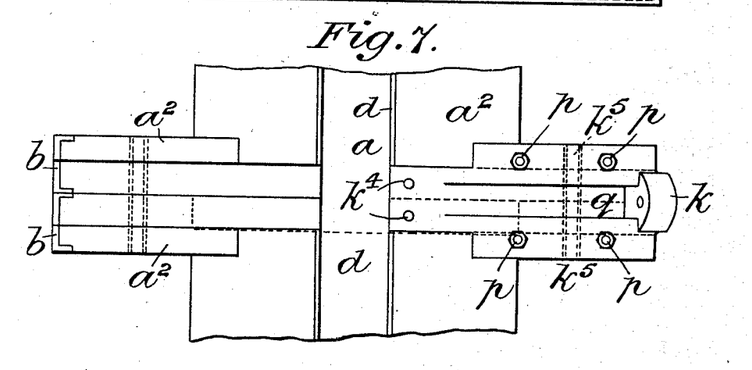
Figure 8:
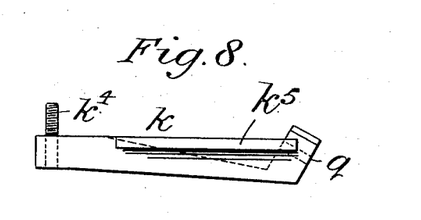
Figure 9:
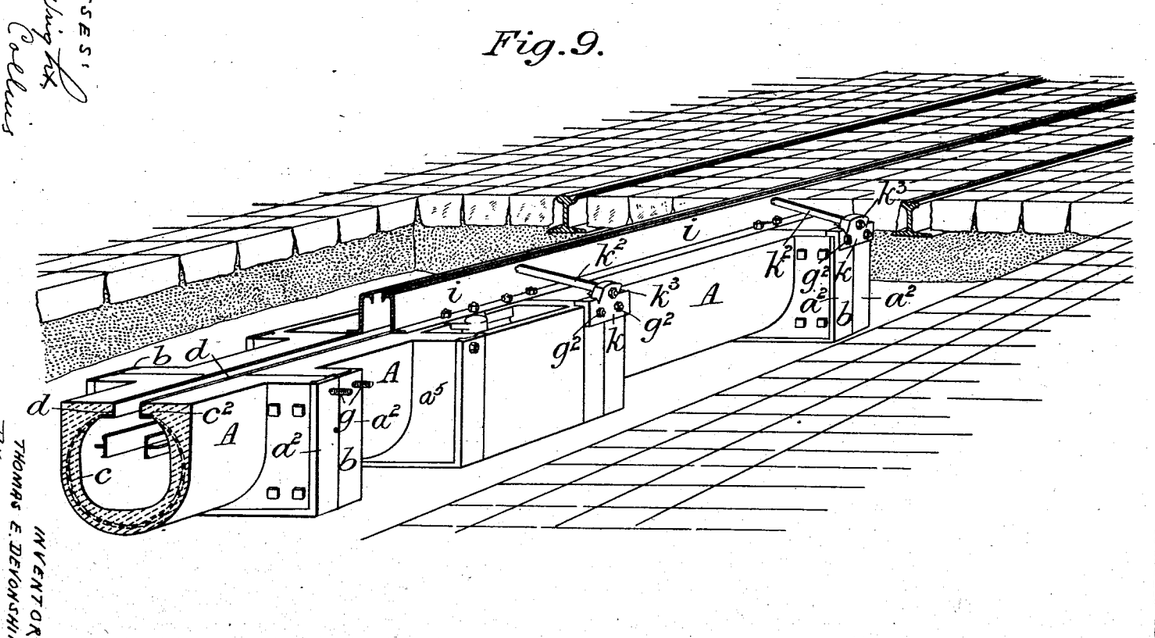

Figs. 5, 6, and 7 show in end elevation, in side view, and in plan, respectively, a modified form of the anchoring or holding-back arrangement, the lug-piece $k$ being sufficiently long to extend to beneath the foot-flange of the slot-rail $i$, where it carries screw-studs $k^4$ to pass through the said foot-flange and receive fastening-nuts. The said lug-piece $k$ is formed with two side flanges $k^5$ to rest on each of two adjacent flanges $a^2$ and is provided with bolt-holes through which the screwed ends of bolts $p$ pass to receive nuts, the other ends of the said bolts being embedded in the flanges $a^2$. The piece $k$ has a hole at $q$ for attaching a tie-bolt for connecting the slot-rails $i$, as described with regard to the bar $k^2$ in Figs. 1 and 2. The said piece $k$ is recessed at $r$ to receive the said tie-bar. Fig. 8 represents the piece $k$ separately. Fig. 9 illustrates some of the lengths of conduit made according to my invention and connected together and in the road with part of the excavation unfilled in.

Where inspection-boxes are required—say at the places where the insulators supporting the conductors are situated—the said inspection-boxes can be made by providing the body part with an additional flange at $a^5$ and making the part between it and one of the end flanges with a flat bottom and two sides constituting a box $v$, which can be covered with the usual cover.

Referring now to Figs. 10 to 16, the body part of each of the lengths of conduit is made up of metal and cement, mortar, or concrete, molded around the metal after the manner hereinbefore described; but each of the end flanges is provided with a metal framework, which is embedded in the cement, mortar, or concrete of the flange and is preferably composed of angle-bars bolted or otherwise united together, so as to form three sides of a rectangle, and connected with the metal of the body part, so as to form a connected framework for the whole of the body part and the flanges. An angle-iron ring $b^2$ (open at the top where the slot $a$ in the conduit comes) forms the central portion of the flange framework and is riveted or otherwise secured to a plate $f$, which is riveted or otherwise secured to the lower angle-iron $b^3$—for example, by means of rivets passing through the flanges of the straight and circular angle-irons $b^2$ $b^3$, respectively. At the top of the side angle-irons $b^4$ are flat bars $b^5$, welded or otherwise secured to the side angle-irons $b^4$ and the angle-iron ring $b^2$, so that the whole forms a metal frame rectangular on the outside and circular on the inside, both the rectangle and the circle being interrupted at the part $a$, so as to provide for the requisite longitudinal slot in the conduit. This framework is completed by a bracing of metal net-work $c^3$ (preferably expanded metal) of the shape of the frame and attached to it, say, by flat bars $b^6$, riveted to the respective angle-irons. When a length of conduit is completed, this metal construction inclosed in the flanges $a^2$ makes them very rigid pedestals or supports for the intermediate body part A and any load that the conduit will have to carry. The body part or portion of the length of conduit A between the flanges $a^2$ is composed of cement, mortar, or concrete with a metal framework embedded therein, as hereinbefore described, the metal, however, being connected to and supported at its ends by the metal framework of the flanges $a^2$. The metal strip along each of the upper sides of the expanded metal $c$ of the body part is at each end riveted or otherwise secured to the metal framework of the respective flanges $a^2$ by means of an angle-plate $d^2$, the reticulated or perforated portion of the metal of the body part A passing through the ring $b^2$ in each flange in which it lodges. When the frameworks of the body part A and the flanges $a^2$ have been secured together, the cement, mortar, or concrete is molded around them in a mold provided with a core, as hereinbefore described. To connect the lengths of conduit together, I abut the contiguous flanges $a^2$ together and unite them by bolts $a^4$, passed through ferrules $a^3$, previously threaded through the meshes of the framework of the flanges and supported in the mold. The jointing may be effected by making a groove $t$ in the face of the cement, mortar, or concrete of each of the flanges and filling these grooves (when they meet and form a passage on the flanges being placed together) with cement.

Figure 10:
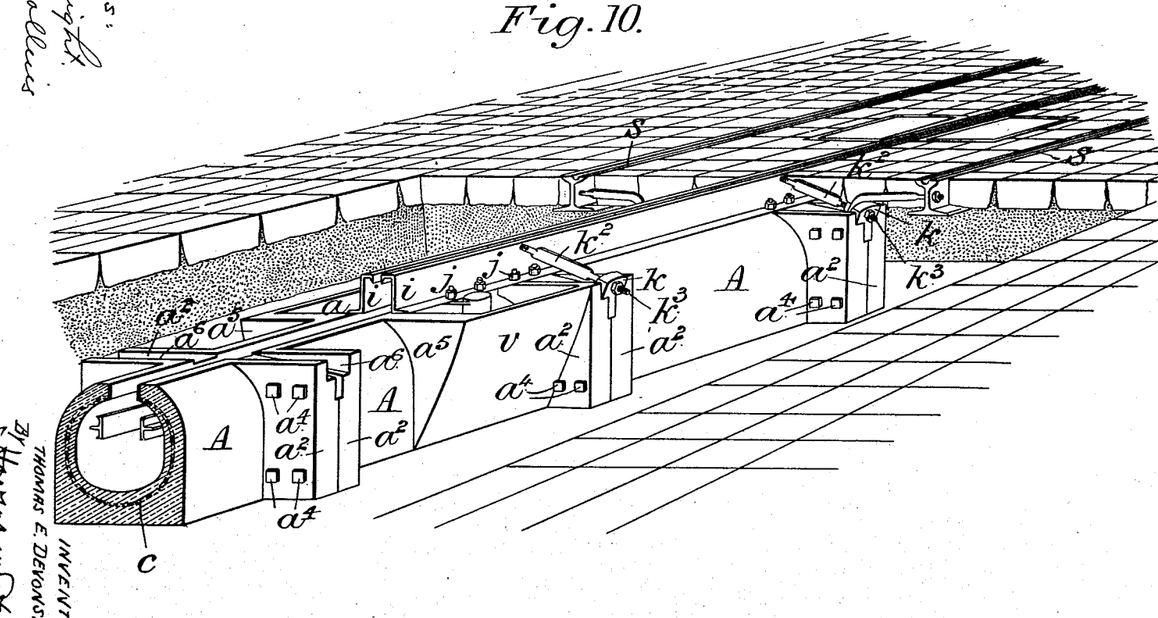
Figure 11:
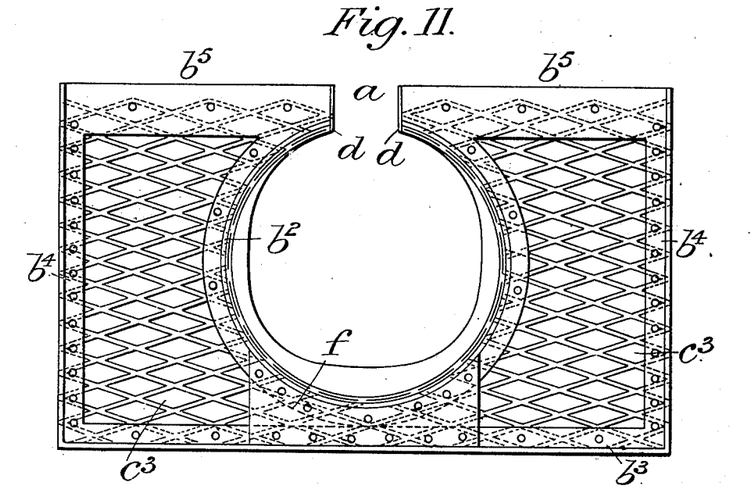
Fig. 11 represents the metal construction for embedding in the flanges at each end of each length of conduit.
Figure 12:
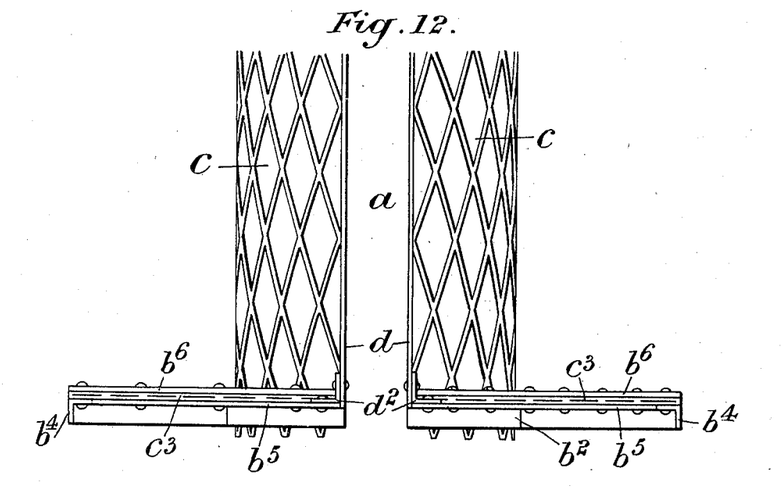
Fig. 12 is a plan of the construction shown in Fig. 11 and of a portion of the metal construction which is embedded in the body part of each of the lengths of conduit.
Figure 13:
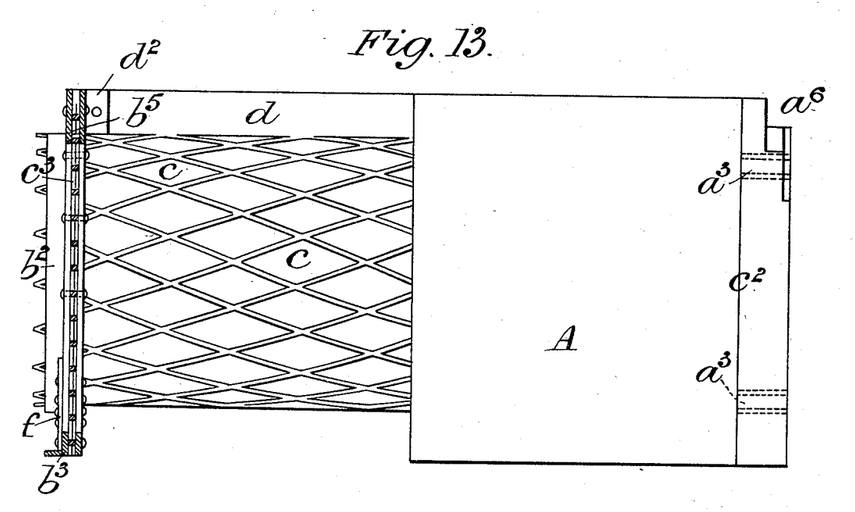
Fig. 13 is a side elevation of a length of conduit with the cement, mortar, or concrete removed from one half.
Figure 14:
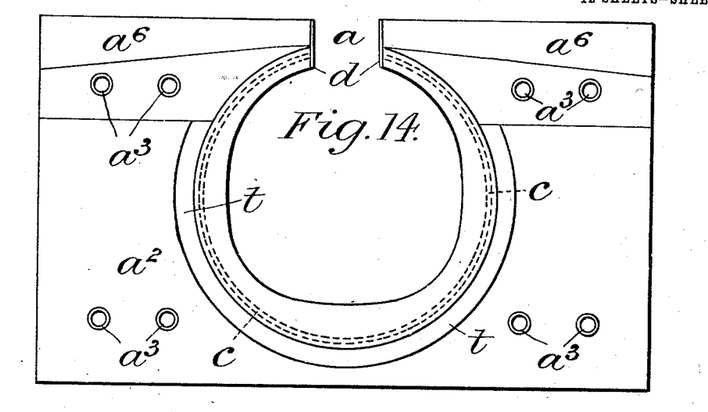
Fig. 14 is an end view, and Fig. 15 a partial plan, of a length of conduit in accordance with my invention, showing it with the cement, mortar, or concrete molded over the metal constructions.
Figure 15:
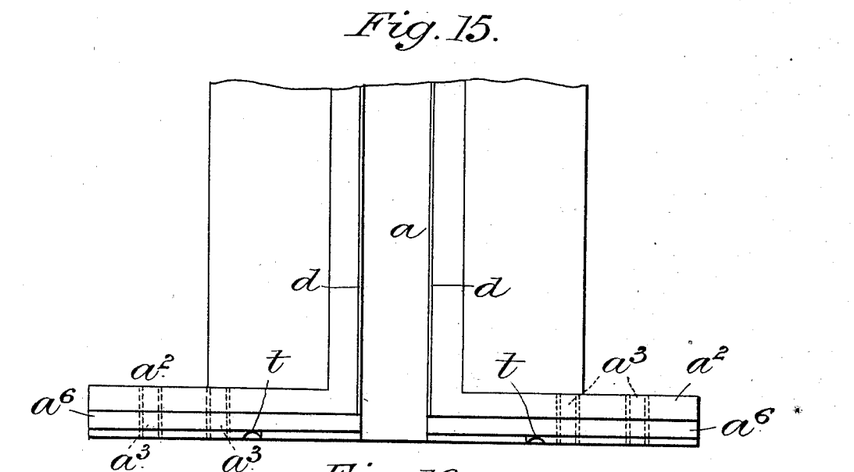
Figure 16:
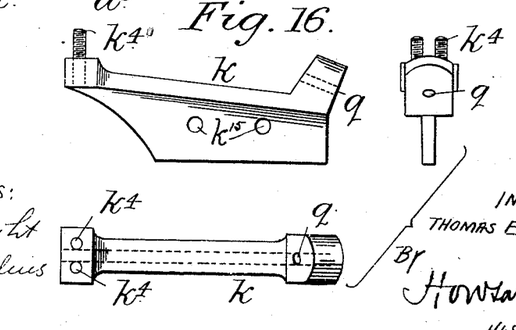
Fig. 16 shows in side elevation, plan, and end view one of the brackets for carrying, attaching, and anchoring or holding back the slot-rails.
Figure 17:
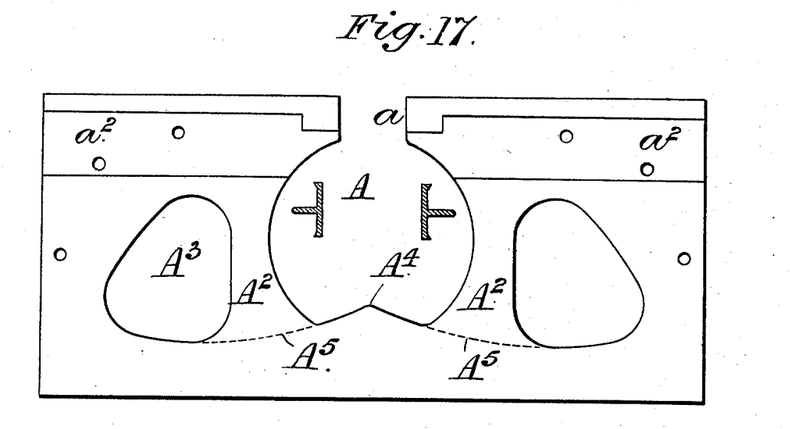
Figure 18:
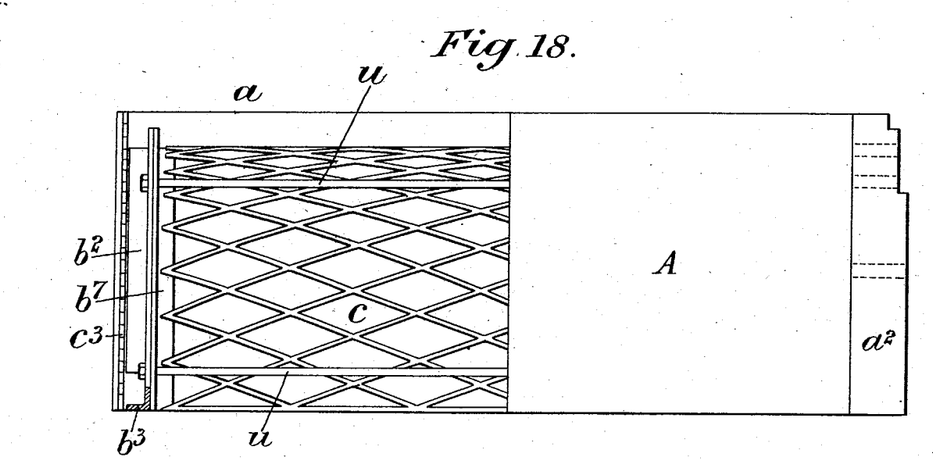
Fig. 18 is a side view, with part of the cement, mortar, or concrete removed, of a length of conduit according to my invention provided with the aforesaid side channels to receive mud, water, or snow.

In Fig. 10 the inspection-boxes are shown made with inclined sides, one end of the box being formed by the flange $a^2$ of the length of conduit, made as described, and the other end $a^5$ being molded on a metal framework similar in construction to that of the flanges, but without the lower corners of the rectangle. The upper parts of the flanges $a^2$ are molded with a recess $a^6$ at each side to form (when the flanges are placed together) at each side, as shown, seatings for the reception of the castings $k$. In laying the conduit the bolts $a^4$ are removed and the said castings $k$ put in place, and the bolts $a^4$ are then put in place again, they passing through the ferrules $a^3$ and the holes $k^{15}$ in the web of the casting $k$, and the nuts on the ends of the bolts are screwed up, so as to cause the flanges $a^2$ to closely abut against each other. The castings $k$ are provided at their inner end with a screwed stud $k^4$ to pass through the bottom flange of the slot-rails $i$ and at the other end with a lug with an opening $q$ to receive the tie-rod $k^2$, anchoring or holding back the slot-rails $i$, as hereinbefore described. The recesses $a^6$ in the flanges $a^2$ for the castings $k$ are preferably made large enough to give room to run in cement to fix the castings $k$ firmly in position.

Figure 19:
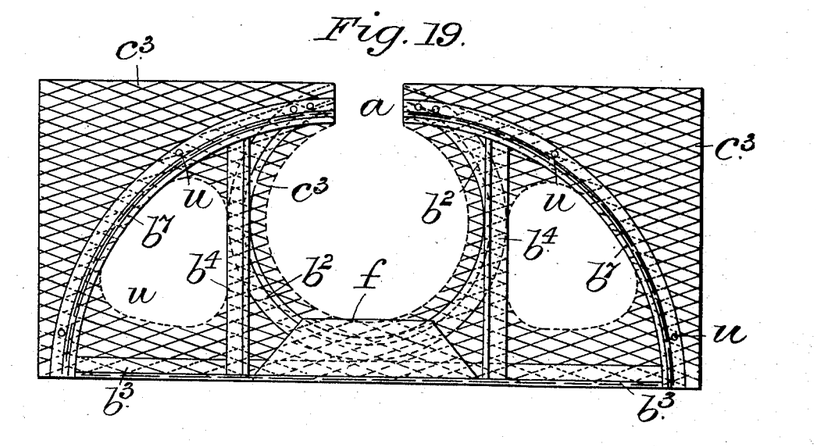
Fig. 19 shows the metal construction for the end flanges of each of the lengths of such conduit.

Figs. 17 to 20 represent the aforesaid conduit with side channels $A^3$ and a central longitudinal projection $A^4$ for conducting water, mud, or snow into the said side channels $A^3$, the projection $A^4$ forming a ridge having at each side a sloped part $A^5$, so that water, mud, or the like entering the slot $a$ above will be directed into the side channels $A^3$ and prevent any accumulation under the conductor-rails. At the flanged ends of the lengths of conduit pedestals or columns $A^2$ add greatly to the strength of the conduit. Similar pedestals or columns may be made at any desired place or places in the lengths of conduit, or, if desired, they may be replaced by walls with openings through them at their lower part to give access for water, snow, or mud from the central channel A to the side channels $A^3$. Fig. 19 shows the metal framework for embedding in the flanges $a^2$. It is composed of an angle-iron ring $b^2$, riveted by means of a gusset-plate $f$ to a straight angle-iron $b^3$, uprights $b^4$ being riveted to the ring $b^2$ and the angle-iron $f$ to give further rigidity to the framing. The columns thus formed support the upper ends of two curved angle-irons $b^7$, the lower ends of which are connected to the lower angle-iron $f$, the said curved angle-irons $b^7$ serving as a bearing for the perforated metal, metal network, or expanded metal of the body part of the lengths of conduit. The perforated metal, metal network, or expanded metal $c^3$ for the flanges has openings formed in it corresponding to the side channels $A^3$, and its edges may be placed either outside or inside the angle-irons or between them and metal strips. To further unite the framings of the flanges and of the body part of the length of conduit, I may use tie-rods $u$, which pass through the angle-irons of the frameworks of the two flanges and are fastened by nuts. The slot-rails $i$ are firmly supported throughout their entire length an each side of the slot $a$ in the conduit, and their depth may, if desired, be considerably reduced without fear of their yielding under heavy loads.

Figure 20:
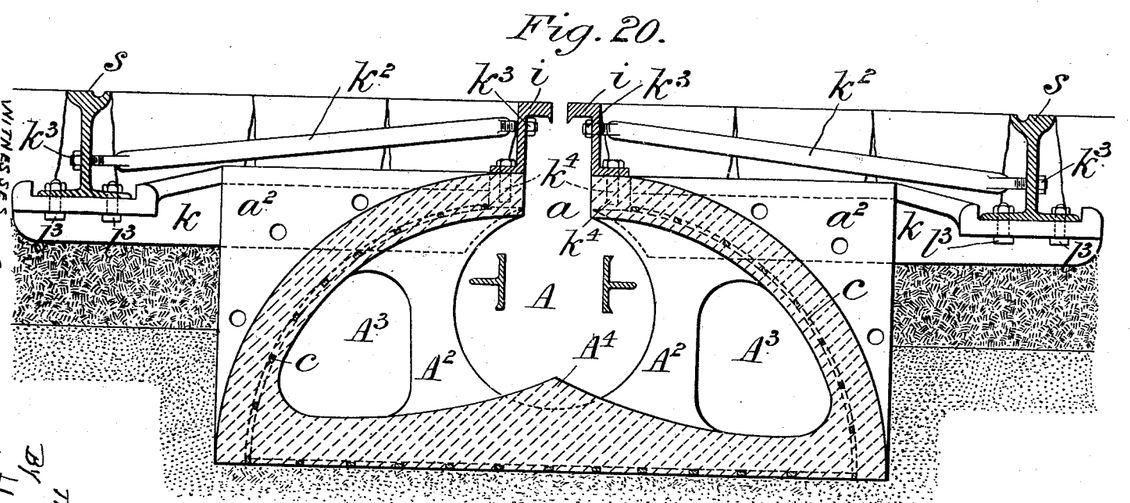
Fig. 20 shows in transverse section the arrangement in place in the road.
Figure 21:
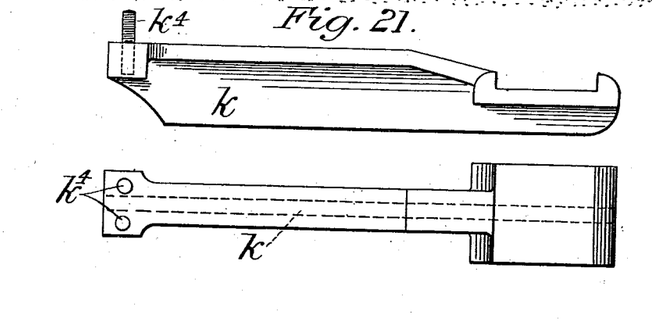
Fig. 21 shows in side elevation and plan one of the brackets for connecting the slot-rails and the track-rails on which the wheels of the vehicles run.

If it be desired to carry the track-rails $s$, on which the wheels of the vehicle run, on the same rigid support as the slot-rails $i$ and to avoid making the flanges $a^2$ unduly wide transversely for such purpose, I mount the rails in metal brackets $k$, provided with bolts $k^4$ for the connection of the slot-rails, as hereinbefore described, and of sufficient length to come under the track-rails $s$ at each side. These brackets may be set in recesses left in the casting of the flanges of the lengths of conduit and be connected to the said flanges, as hereinbefore described, the track-rails $s$ being bolted to the brackets by bolts $l^3$, as shown in Fig. 20, the slot opening between the slot-rails $i$ being maintained by anchoring or holding back the respective slot-rails $i$ by the tie-bars $k^2$, which in this case are bolted to the webs of the said track-rails. Should snow or other matter lodge on the ridge $A^4$, it can readily be pushed to either side by a brush or scraper inserted through the slot $a$, and the channels $A^3$ can from time to time be flushed or swept through the insulator-manholes or inspection-boxes. The cross-section of the conduit may be of any suitable form, and the lengths of conduit may be made straight or curved to suit straight or curved portions of the line, and lengths made bifurcated may be made for use at junctions of two lines of track.

I claim as my invention—

1. An underground conduit formed of slotted lengths having body parts, consisting of a combination of concrete and metal, and means for bolting the lengths together, substantially as described.

2. An underground conduit formed in lengths each consisting of a concrete body part, provided with flanges at the ends, and with metal network embedded in the said body part, substantially as described.

3. An underground conduit formed in slotted lengths, each consisting of a concrete body part, provided with flanges at the ends and with a metal network embedded in both the said body part and the said flanges, substantially as described.

4. An underground continuously-slotted conduit consisting of concrete slotted lengths, metal embedded therein, flanged ends for the lengths butting against each other, the ends also having a metal framework and concrete body, and forming pedestals, adapted to maintain the slot-opening against external stresses, and adapted to support the intermediate body part of the lengths, the said body part being composed of concrete, and provided with a metal core so disposed as to enable the body part to resist outside stresses, to which the conduit may be subjected at points between the flanged ends of its lengths, substantially as described.

5. An underground conduit formed in lengths, each consisting of a concrete body part, slotted at top and having metal linings along each side of the slot, the said body part being provided with flanges at the ends and having metal network embedded in the said body part and attached to the metal lining of the slot, substantially as hereinbefore described.

6. An underground conduit formed in slotted lengths, each consisting of, or comprising, a cement, mortar, or concrete, body part formed with a flange at each end, and with perforated metal, or metal network, or "expanded metal," forming a connected framework embedded in the said body part and also in the flanges; substantially as hereinbefore described.

7. An underground concrete conduit, formed in slotted lengths, each having a central channel, and side channels within the one concrete mass, the side channels being in communication with the said central channel, and a longitudinal raised portion of concrete along the bottom of the central channel, and portions, on either side, down which mud, water, or snow can pass into the side channels, substantially as described.

8. An underground conduit formed in slotted lengths, each having a body part with a flange at each end, and a central channel with side channels in communication with the said central channel, and pedestals, or columns, or perforated walls, between the central channel and the side channels, and means for directing mud, water, or snow, from the central channel to the side channels, substantially as hereinbefore described.

9. An underground conduit formed in slotted lengths, each consisting of a body part (with a flange at each end), made of cement, mortar, or concrete, having metal embedded therein, the flanges being provided with grooves in their faces for the reception of cement for making a joint; substantially as hereinbefore described.

10. In combination with slotted lengths of conduit consisting of a body part, with a flange at each end, and formed of cement, mortar, or concrete, with metal embedded therein; castings carried by the upper parts of adjacent flanges and provided with means for connecting the said castings to the said flanges, and an inward extension of the said castings carrying means for the attachment of the slot-rails; substantially as hereinbefore described.

11. In combination with slotted lengths of conduit consisting of a body part, with a flange at each end, and formed of cement, mortar, or concrete, with metal embedded therein; castings carried by the upper parts of adjacent flanges, and extending inward to beneath the slot-rails, and outward to beneath the respective track-rails, and means for connecting the slot-rails and track-rails to the respective ends of the said casting; substantially as hereinbefore described.

12. An underground conduit formed in lengths, each consisting of a concrete body part, slotted at top and with metal linings along each side of the slot, the said body part being formed with flanges at the ends, the said flanges being strengthened by metal connected to the metal lining of the slot, and the said body part having embedded in it metal network, attached to the metal lining of the slot and to the metal of the flanges and means for anchoring or holding back the slot-rails to the frames around the flanges, substantially as described.

13. An underground conduit, formed in lengths each consisting of a concrete body part, slotted at top and with metal linings along each side of the slot, the said body part being formed with flanges and joints at the ends, such flanges being provided with embedded metal, and the joints being faced with metal and the said body part having embedded in it metal network attached to the metal lining of the slot and to the metal of the flanges, substantially as described.

In testimony whereof I affix my signature in presence of two witnesses.

THOMAS EASTON DEVONSHIRE.

Witnesses:
WILLIAM JOHN WEEKS,
HENRY DENIS HOSKINS.